J. SCHMID-ROOST.
BALL BEARING FOR CAR AXLES.
APPLICATION FILED OCT. 9, 1912.
1,173,391.
Patented Feb. 29, 1916.
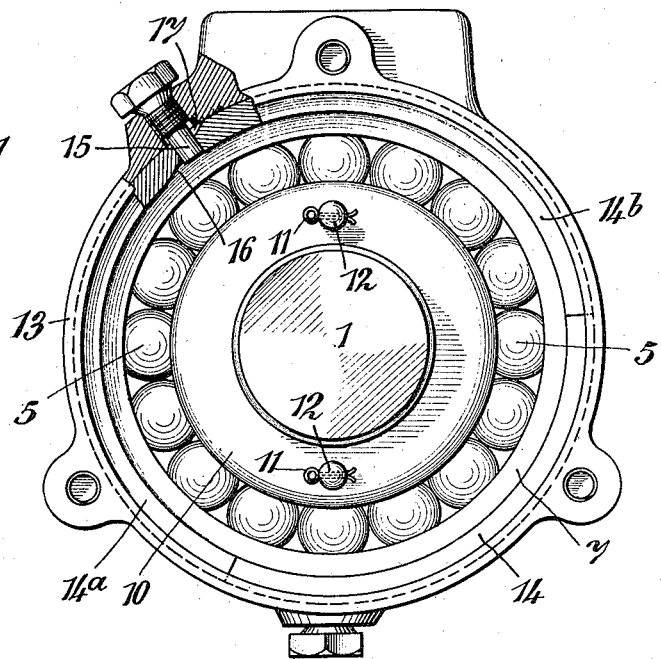
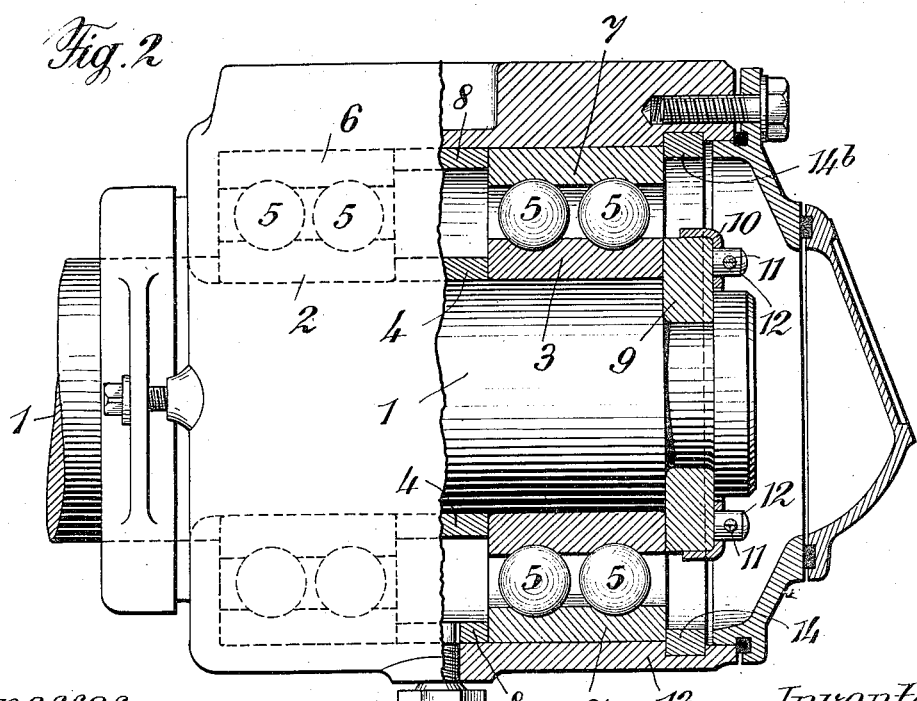

UNITED STATES PATENT OFFICE.

JAKOB SCHMID-ROOST, OF OERLIKON, SWITZERLAND.

BALL-BEARING FOR CAR-AXLES.

1,173,391.  Specification of Letters Patent.  Patented Feb. 29, 1916.

Application filed October 9, 1912. Serial No. 724,760.

*To all whom it may concern:*

Be it known that I, JAKOB SCHMID-ROOST, a citizen of the Republic of Switzerland, residing at Oerlikon, Switzerland, have invented new and useful Improvements in Ball-Bearings for Car-Axles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to a ball bearing for car axles, which is provided with several ball race bearings.

In the accompanying drawing the invention is illustrated by way of example.

Figure 1 is a front elevation of a ball bearing according to my invention, the cover being removed. Fig. 2 is a side elevation of the same partly in section.

1 designates the end of a car axle to which two inner ball races 2, 3 are secured, and between them a ring 4 is mounted on the axle. The ball races 2, 3 together with the balls 5 and the outer ball races 6 and 7 form two ball race bearings. Between the outer ball races 6 and 7 there is provided a ring 8. Outside the ball race bearing 3, 7 the end 1 of the axle is annularly grooved, where it receives a ring 9 consisting of several segments, which bears against the ball race 3. The purpose of the ring 9 is to take up axial shocks transmitted to the ball race 3 either directly or by means of the ring 4. The segments of the ring 9 are held upon the axle by a cap 10. The cap is secured to the ring by studs 12 in the segments of the latter, which studs pass through holes in the cap and receive split-pins 11. A ring 14 which bears against the ball race 7 is inserted in an annular groove of the box 13. The purpose of the ring 14 is to take up axial shocks transmitted to the ball race 7 either directly or by means of the ring 8. In order to insert the ring 14 in the annular groove it is made of three parts (Fig. 1). Two adjacent parts 14$^a$ and 14$^b$ are somewhat shortened at their opposed ends so that by a screw 15 mounted between them, which may be conical, the ring can be pressed in the groove. In order to facilitate the inserting and removing of the parts 14$^a$, 14$^b$ they are beveled at 16, 17.

I claim:

1. In a ball-bearing for car axles, a box surrounding the axle, an inner and an outer race-ring interposed between the box and axle, balls between the rings, a sectional thrust ring mounted in an annular groove formed in the box at the end of and abutting the outer race ring, a screw projecting through the box and between beveled ends of adjacent sections of the ring mounted in said annular groove, and a segmental ring mounted in a groove in the axle at the end of and abutting the inner race ring.

2. In a ball-bearing for car axles, a box surrounding the axle, an inner and an outer race ring interposed between the box and axle, antifriction members interposed between said rings, a sectional, non-yielding thrust ring less than a full circle mounted in a groove formed in the box at the end of and abutting the outer race ring, means on the box inserted between adjacent section ends of said thrust ring to hold the ring in place, a segmental ring mounted in a groove in the axle at the end of and abutting the inner race ring to hold the latter in place, and a cap on the segmental ring to hold the latter in the groove of the axle.

In testimony that I claim the foregoing as my invention, I have signed my name in presence of two subscribing witnesses.

JAKOB SCHMID-ROOST.

Witnesses:
 ERNST FISCHER,
 CARL GUALD.